United States Patent
Kim et al.

(10) Patent No.: US 12,147,472 B2
(45) Date of Patent: Nov. 19, 2024

(54) DATA INTERWORKING METHOD BETWEEN ONEM2M SYSTEM AND NGSI-LD SYSTEM

(71) Applicant: Korea Electronics Technology Institute, Seongnam-si (KR)

(72) Inventors: Seong Yun Kim, Seoul (KR); Sung Chan Choi, Seoul (KR); Jong Hong Park, Seongnam-si (KR); Sung Wook Jung, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 17/796,598

(22) PCT Filed: Oct. 19, 2021

(86) PCT No.: PCT/KR2021/014593
§ 371 (c)(1),
(2) Date: Jul. 29, 2022

(87) PCT Pub. No.: WO2023/068394
PCT Pub. Date: Apr. 27, 2023

(65) Prior Publication Data
US 2024/0184824 A1 Jun. 6, 2024

(30) Foreign Application Priority Data
Oct. 19, 2021 (KR) .................. 10-2021-0139300

(51) Int. Cl.
*G06F 16/901* (2019.01)
(52) U.S. Cl.
CPC ................. *G06F 16/901* (2019.01)
(58) Field of Classification Search
CPC .................................................. G06F 16/901
(Continued)

(56) References Cited

U.S. PATENT DOCUMENTS 11,949,802 B1* 4/2024 Kim .................. H04L 9/50
2018/0102934 A1* 4/2018 Ly .................. H04L 67/146
(Continued)

FOREIGN PATENT DOCUMENTS

| CN | 109997114 A | 7/2019 |
| JP | 2020-506564 A | 2/2020 |
| KR | 10-2014-0110172 A | 9/2014 |
| KR | 10-2018-0051583 A | 5/2018 |

(Continued)

OTHER PUBLICATIONS

Korean Office Action issued on Mar. 31, 2022 in corresponding Korean Patent Application No. 10-2021-0139300 (6 pages in English and 7 pages in Korean).

*Primary Examiner* — Muluemebet Gurmu
(74) *Attorney, Agent, or Firm* — NSIP Law

(57) ABSTRACT

There is provided a data interworking method between a oneM2M system and an NGSI-LD system. The data interworking method according to an embodiment of the present disclosure includes: retrieving, by an IPE, resources in the oneM2M system that perform data interworking with the NGSI-LD system; retrieving labels of the retrieved resources; acquiring a mapping-rule from the retrieved labels; and storing the acquired mapping-rule. Accordingly, data interworking between data platforms using different standards is performed more easily, so that technology may go one step further to the goal of interconnecting and servicing all things in a global environment as IoT ultimately pursues.

16 Claims, 8 Drawing Sheets

(58) Field of Classification Search
USPC .......................................................... 707/741
See application file for complete search history.

(56) References Cited

U.S. PATENT DOCUMENTS

| | | | |
|---|---|---|---|
| 2018/0205801 A1* | 7/2018 | Kovacs | ................. H04L 67/565 |
| 2018/0227368 A1* | 8/2018 | Zhao | ....................... H04L 67/12 |
| 2018/0295197 A1 | 10/2018 | Vedula et al. | |

FOREIGN PATENT DOCUMENTS

| | | |
|---|---|---|
| KR | 10-2019-0065372 A | 6/2019 |
| KR | 10-1997603 B1 | 10/2019 |
| KR | 10-2021-0027527 A | 3/2021 |
| KR | 10-2224379 B1 | 3/2021 |
| KR | 10-2021-0043865 A | 4/2021 |
| KR | 10-2021-0066114 A | 6/2021 |
| KR | 10-2270481 B1 | 6/2021 |
| KR | 10-2285352 B1 | 8/2021 |
| KR | 10-2389004 B1 | 4/2022 |
| WO | WO 2017/061815 A1 | 4/2017 |
| WO | WO 2018-067939 | 4/2018 |

* cited by examiner

FIG. 4 oneM2M Label

| Label Key Name | Data Type | Restriction | Cardinality | Description |
|---|---|---|---|---|
| lwked-Technology | String | NGSI-LD | 1 | Interworking technology |
| lwked-Direction | List of String | oneM2MtoNGSI-LD NGSI-LDtooneM2M | 1 | Transmit to NGSI-LD broker (synchronization) or transmit to oneM2M (synchronization) |
| lwked-Entity-Type | String | NGSI-LD Entity Type | 1 | NGSI-LD Entity type |
| lwked-mapping-rule | List of MappingRule | | 1 | JSON, XML, Plaintext values may exist within oneM2M contentinstance. JSON, XML has a key value and an NGSI-LD Entity Attribute ID mapping value (When an Attribute ID is expressed, NGSI-LD query expression is applied). XXXXXX in the case of Plaintext |
| lwked-Entity-ID | String | | 0..1 | Use in the presence, Platform ID+":" unstructuredResourceId in the absence. oneM2M Resource ID |
| lwked-Related-Resources | List of String | | 0..1 | oneM2M Resource ID |
| Ngsi-Ld-Context | List of String | | 1 | Value to be transmitted as a context value |
| oneM2M Data Schema | String | | 1 | Scheme information containing oneM2M JSON |
| ngsi-ldDataSchema | String | | 1 | Scheme information corresponding data of NGSI-LD |

FIG. 5

Mapping-Rule

| Name | Data Type | Restriction | Cardinality | Description |
|---|---|---|---|---|
| oneM2MResourceId | String | | 0..1 | |
| oneM2MAttributeName | String | | 0..1 | Default: "con" |
| oneM2MJsonPath | String | | 0..1 | Use only when the inside of "con" is JSON |
| oneM2MDataType | String | | 0..1 | Not specified when a corresponding type is used as it is |
| ngsi-ldQueryTermAttributePath | String | | 1 | AttributePath portion of QueryTerm of Query Language |
| ngsi-ldAttributeType | String | Property or Relationship | 1 | |
| ngsi-ldAttributeDataType | String | | 0..1 | Not specified when a corresponding type is used as it is |

Label setting value

"lbl": {
    "lwked-Technology:NGSI-LD",
    "lwked-Direction:[₩"oneM2MtoNGSI-LD₩"]",
    "lwked-Entity-Type:http://uri.citydatahub.kr/ngsi-ld/context#OffStreetParking",
    "lwked-mapping-rule:[{₩"oneM2MAttributeName₩": ₩"con₩",₩"oneM2MJsonPath₩": ₩"$.name₩", ₩"oneM2MDataType₩": ₩"STRING₩",₩"ngsi-ldQueryTermAttributePath₩": ₩"name₩",₩"ngsi-ldAttributeType₩": ₩"Property₩",₩"ngsi-ldAttributeDataType₩": ₩"STRING₩"},{₩"oneM2MAttributeName₩": ₩"con₩",₩"oneM2MJsonPath₩": ₩"$.address.addressCountry₩",₩"oneM2MDataType₩": ₩"STRING₩",₩"ngsi-ldQueryTermAttributePath₩": ₩"address.addressCountry₩",₩"ngsi-ldAttributeType₩": ₩"Property₩",₩"ngsi-ldAttributeDataType₩": ₩"STRING₩"},{₩"oneM2MAttributeName₩": ₩"con₩", ₩"oneM2MJsonPath₩": ₩"$.refParkingSpots₩",₩"oneM2MDataType₩": ₩"ARRAYSTRING₩",₩"ngsi-ldQueryTermAttributePath₩": ₩"refParkingSpots₩",₩"ngsi-ldAttributeType₩": ₩"Relationship₩",₩"ngsi-ldAttributeDataType₩": ₩"ARRAYSTRING₩"},{₩"oneM2MResourceId₩": ₩"Mobius/sync_parking_raw/yt_lot_2/la₩",₩"oneM2MAttributeName₩": ₩"con₩",₩"oneM2MDataType₩": ₩"STRING₩",₩"ngsi-ldQueryTermAttributePath₩": ₩"availableSpotNumber₩",₩"ngsi-ldAttributeType₩": ₩"Property₩",₩"ngsi-ldAttributeDataType₩": ₩"INTEGER₩"},{₩"oneM2MResourceId₩": ₩"Mobius/sync_parking_raw/yt_lot_2/la₩",₩"oneM2MAttributeName₩": ₩"lt₩",₩"oneM2MDataType₩": ₩"TIMESTAMP₩",₩"ngsi-ldQueryTermAttributePath₩": ₩"availableSpotNumber.observedAt₩",₩"ngsi-ldAttributeType₩": ₩"Property₩",₩"ngsi-ldAttributeDataType₩": ₩"DateTime₩"}]",
    "lwked-Entity-ID:urn:offstreetparking:yt_lot_2",
    "lwked-Related-Resources:[₩"Mobius/sync_parking_raw/yt_lot_2/la₩"]",
    "Ngsi-Ld-Context:[₩"http://uri.citydatahub.kr/ngsi-ld/additional-contexts.jsonld₩", ₩"https://uri.etsi.org/ngsi-ld/v1/ngsi-ld-core-context-v1.3.jsonld₩"]"
    }

FIG. 6

DATA INTERWORKING METHOD BETWEEN ONEM2M SYSTEM AND NGSI-LD SYSTEM

CROSS REFERENCE TO RELATED APPLICATIONS

This application is a U.S. National Stage Application of International Application No. PCT/KR2021/014593, filed on Oct. 19, 2021, which claims the benefit under 35 USC 119(a) and 365(b) of Korean Patent Application No. 10-2021-0139300, filed on Oct. 19, 2021, in the Korean Intellectual Property Office, the entire disclosure of which is incorporated herein by reference for all purposes.

TECHNICAL FIELD

The present disclosure relates to data interworking technology, and more particularly, to a data interworking method between data platforms which employ different standards.

BACKGROUND ART

Recently, interest in Internet of Things (IOT) is increasing, and in addition to industrial circles, standardization organizations are making various efforts to take the lead on IoT. Google, Apple, Amazon, etc. have opened open-type service platforms for IoT in order to lead global markets in the era of IoT based on already secured users, and are endeavoring to establish relevant service ecosystems.

Companies which are in a relatively disadvantageous position in taking the lead in the ecosystem in the era of IoT are devoting much effort to leading the era of the IoT through mutual cooperation based on their strengths.

Development of standards technology through alliance of these companies, and development of various standards by public standards authorities, that is, standards authorities, inevitably require interworking technology between the standards thereof, in order to achieve the goal of interconnecting and servicing all things in a global environment as IoT ultimately pursues.

DISCLOSURE

Technical Problem

The present disclosure has been developed in order to address the above-discussed deficiencies of the prior art, and an object of the present disclosure is to provide a method for performing data interworking between a one machine to machine (oneM2M) system and a next generation service interface-linked data (NGSI-LD) system more easily, as a solution for sharing data between data platforms using different standards.

Technical Solution

According to an embodiment of the present disclosure to achieve the above-described object, a data interworking method includes: a first retrieval step of retrieving, by an IPE, repositories in a first data platform system that perform data interworking with a second data platform system; a second retrieval step of retrieving, by the IPE, labels of the retrieved repositories; a step of acquiring, by the IPE, a mapping-rule from the retrieved labels; and a step of storing, by the IPE, the acquired mapping-rule.

According to an embodiment of the present disclosure, the data interworking method may further include a step of understanding, by the IPE, a data interworking direction from the retrieved labels.

According to an embodiment of the present disclosure, the data interworking method may further include a first interworking step of interworking data of a repository of the second data platform system with data stored in a repository of the first data platform system, based on the stored mapping-rule.

The first data platform system may be a oneM2M system, the second data platform system may be an NGSI-LD system, and the first interworking step may include: a step of subscribing to a resource of the oneM2M system; a step of receiving a notification regarding generation or refining of data of the resource; and a step of storing the notified data in an entity of the NGSI-LD system.

In addition, the step of storing may include collecting the notified data and then storing in the entity.

According to an embodiment of the present disclosure, the data interworking method may further include a second interworking step of interworking the data of the repository of the first data platform system with the data stored in the repository of the second data platform system, based on the stored mapping-rule.

The first data platform system may be a oneM2M system, the second data platform system may be an NGSI-LD system, and the second interworking step may include: a step of subscribing to an entity of the NGSI-LD system; a step of receiving a notification regarding generation or refining of data of the entity; and a step of storing the notified data in a resource of the oneM2M system.

The step of storing may include storing the notified data in a plurality of resources.

The first data platform system may be a oneM2M system, the repositories may be resources, and the first retrieval step may include retrieving resources which interwork based on labels of the resources.

According to another embodiment of the present disclosure, an IoT data platform system includes: a first data platform system configured to collect and store data from IoT devices; a second data platform system configured to collect and store data from IoT devices; and an interworking device configured to retrieve repositories in the first data platform system that perform data interworking with the second data platform system, to retrieve labels of the retrieved repositories, to acquire a mapping-rule from the retrieved labels, and to store the acquired mapping-rule.

According to still another embodiment of the present disclosure, a data interworking method includes: a step of collecting and storing, by a second data platform system, from IoT devices; a first retrieval step of retrieving, by an IPE established in the second data platform system, repositories in a first data platform system that perform data interworking with the second data platform system; a second retrieval step of retrieving, by the IPE, labels of the retrieved repositories; a step of acquiring, by the IPE, a mapping-rule from the retrieved labels; and a step of storing, by the IPE, the acquired mapping-rule.

According to yet another embodiment of the present disclosure, a data platform system may include: a communication unit configured to communicate with IoT devices and an external data platform system; a processor configured to retrieve repositories in the external data platform system that perform data interworking with the data platform system, to retrieve labels of the retrieved repositories, and to acquire a mapping-rule from the retrieved labels; and a storage unit configured to store the acquired mapping-rule.

Advantageous Effects

According to embodiments of the present disclosure as described above, data interworking between data platforms using different standards is performed more easily, so that technology may go one step further to the goal of interconnecting and servicing all things in a global environment that IoT ultimately pursues.

DESCRIPTION OF DRAWINGS

FIG. 4 is a view illustrating a list of labels containing information regarding data interworking that is recorded on a resource of a oneM2M system;

FIG. 5 is a view provided to explain a mapping-rule;

FIG. 6 is a view illustrating labels of a resource;

BEST MODE

Hereinafter, the present disclosure will be described in more detail with reference to the drawings.

An embodiment of the present disclosure suggests a data interworking method between a one machine to machine (oneM2M) system and a next generation service interface-linked data (NGSI-LD) system.

Figure 1:
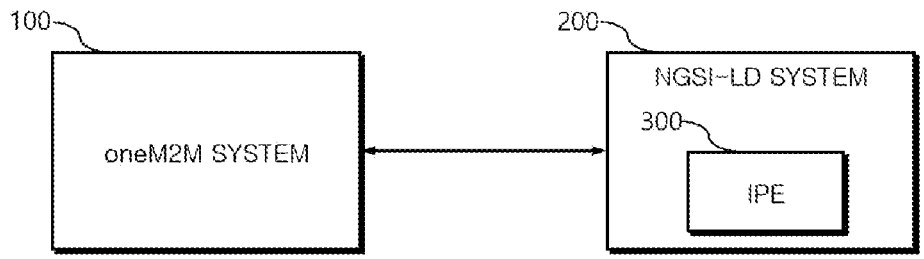
FIG. 1 is a view illustrating an example of an IoT data platform system to which the present disclosure is applicable.

FIG. 1 is a view illustrating an IoT data platform system to which the present disclosure is applicable. The IoT data platform system to which the present disclosure is applicable may include a oneM2M system 100, an NGSI-LD system 200, and an interworking proxy application entity (IPE) 300 as shown in the drawing.

The oneM2M system 100 is a data platform system that collects/stores data from IoT devices according to oneM2M standards, and the NGSI-LD system 200 is a data platform system that collects/stores data from IoT devices according to NGSI-LD standards. That is, both systems apply different standards.

Figure 2:
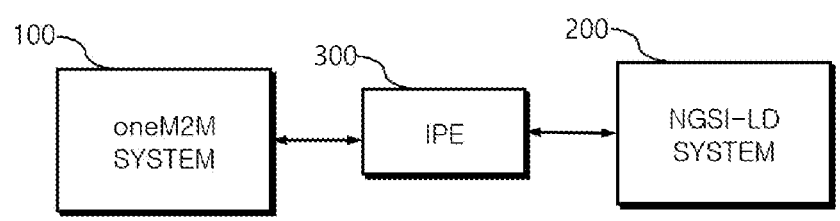
FIG. 2 is a view illustrating another example of the IoT data platform system to which the present disclosure is applicable.

The IPE 300 performs data interworking between the oneM2M system 100 and the NGSI-LD system 200. The IPE 300 may be implemented in the NGSI-LD system 200 as shown in FIG. 1, or may be implemented separately from the NGSI-LD system 200 as shown in FIG. 2.

Figure 3:
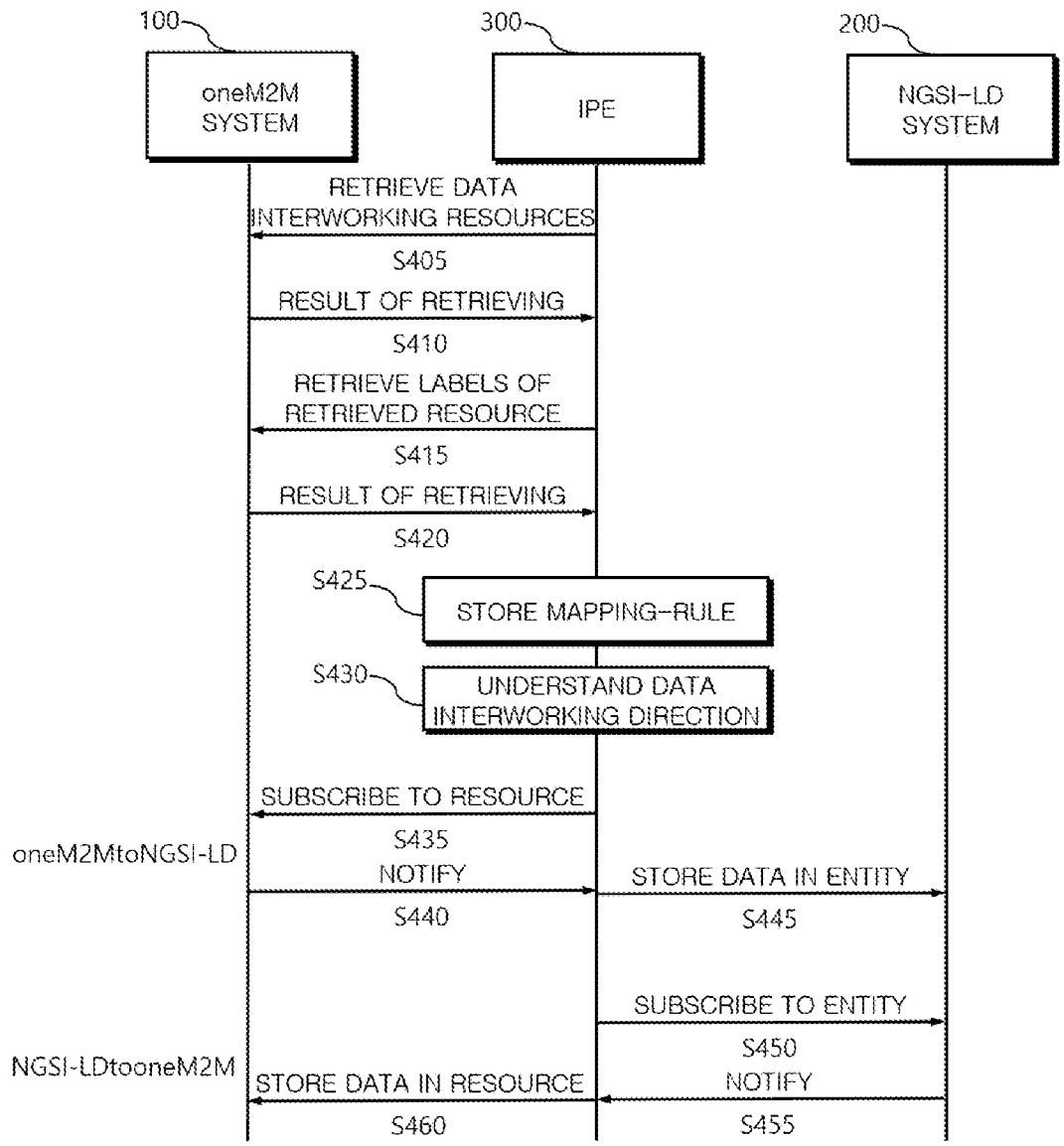
FIG. 3 is a sequence diagram provided to explain a data interworking method between a oneM2M system and an NGSI-LD system according to an embodiment of the present disclosure.

FIG. 3 is a sequence diagram provided to explain a data interworking method between the oneM2M system 100 and the NGSI-LD system 200 according to an embodiment of the present disclosure.

In an embodiment of the present disclosure, data interworking is performed in both directions. That is, it is possible to interwork data of the NGSI-LD system 200 with data of the oneM2M system 100, and it is possible to interwork data of the oneM2M system 100 with data of the NGSI-LD system 200.

For data interworking, the IPE 300 retrieves resources in the oneM2M system 100 which perform data interworking with the NGSI-LD system 200 (S405), and acquires a result of the retrieving (S410).

Retrieving the resources in the oneM2M system 100 which perform data interworking with the NGSI-LD system 200 is performed by referring to labels of the resources. FIG. 4 shows a list of labels (Iwked-Technology label, Iwked-Direction label, Iwked-Entity-Type label, Iwked-mapping-rule label, Iwked-Entity-ID label, Iwked-Related-Resources label, etc.) containing information regarding data interworking among labels recorded on a resource of the oneM2M system 100.

In the resource which performs data interworking with the NGSI-LD system 200, the Iwked-Technology label indicates NGSI-LD, and therefore, the result of retrieving at step S410 is a list of resources on which the Iwked-Technology label indicates NGSI-LD.

Next, the IPE 300 retrieves the labels regarding the retrieved resource of the oneM2M system 100 (S415), and acquires a result of the retrieving (S420). Through steps S415 and 420, the IPE 300 acquires the labels of the resource which perform data interwork with the NGSI-LD system 200.

The IPE 300 stores the Iwkd-mapping-rule label among the acquired labels as a mapping-rule (S425). The mapping-rule is a rule for data interworking between the resource of the oneM2M system 100 and an entity of the NGSI-LD system 200.

In FIG. 5, names, data types, restrictions, cardinalities, descriptions of keys constituting the mapping-rule are defined. The mapping-rule label and the mapping-rule include rules that are generated by using the keys suggested in FIG. 5.

FIG. 6 illustrates labels of the resource acquired at step S420, and mapping-rules generated by using the keys suggested in FIG. 5 in the Iwked-mapping-rule label may be identified.

Next, the IPE 300 understands a data interworking direction regarding the resource of the oneM2M system 100 which is retrieved through steps S415 and S420 (S430). The data interworking direction is indicated by the Iwked-Direction label among the labels suggested in FIG. 4.

When the Iwked-Direction label indicates "oneM2MtoNGSI-LD", it means that data stored in the resource of the oneM2M system 100 is transmitted to and stored in the entity of the NGSI-LD system 200, that is, data of the entity of the NGSI-LD system 200 interworks with the resource of the oneM2M system 100.

When the data interworking direction is "oneM2MtoNGSI-LD", the IPE 300 subscribes to the corresponding resource of the oneM2M system 100 (S435). Thereafter, when data is generated or refined in the corresponding resource of the oneM2M system 100 and is notified (S440), the IP 300 stores the notified data in a corresponding entity of the NGSI-LD system 200 as a corresponding type, by referring to the mapping-rule (S445).

At step S445, the data may be stored by upserting the data into the corresponding entity of the NGSI-LD system 200.

On the other hand, when the Iwked-Direction label indicates "NGSI-LDtooneM2M", it means that data stored in the entity of the NGSI-LD system 200 is transmitted to and stored in the resource of the oneM2M system 100, that is, the resource data of the oneM2M system 100 interworks data of the entity of the NGSI-LD system 200.

Accordingly, when the data interworking direction is "NGSI-LDtooneM2M", the IPE 300 subscribes to the corresponding entity of the NGSI-LD system 200 (S450). Thereafter, when data is generated or refined in the corresponding entity of the NGSI-LD system 200 and is notified (S455), the IPE 300 may store the notified data in the corresponding resource of the oneM2M system 100 as a corresponding data type, by referring to the mapping-rule (S460).

At step 460, the data may be stored by generating contentInstrance having data recorded on the corresponding resource of the oneM2M system 100.

Steps S415 to S460 are performed on a resource basis. That is, steps S415 to S460 may be performed with respect to all of the resources retrieved at step S410.

Figure 7:
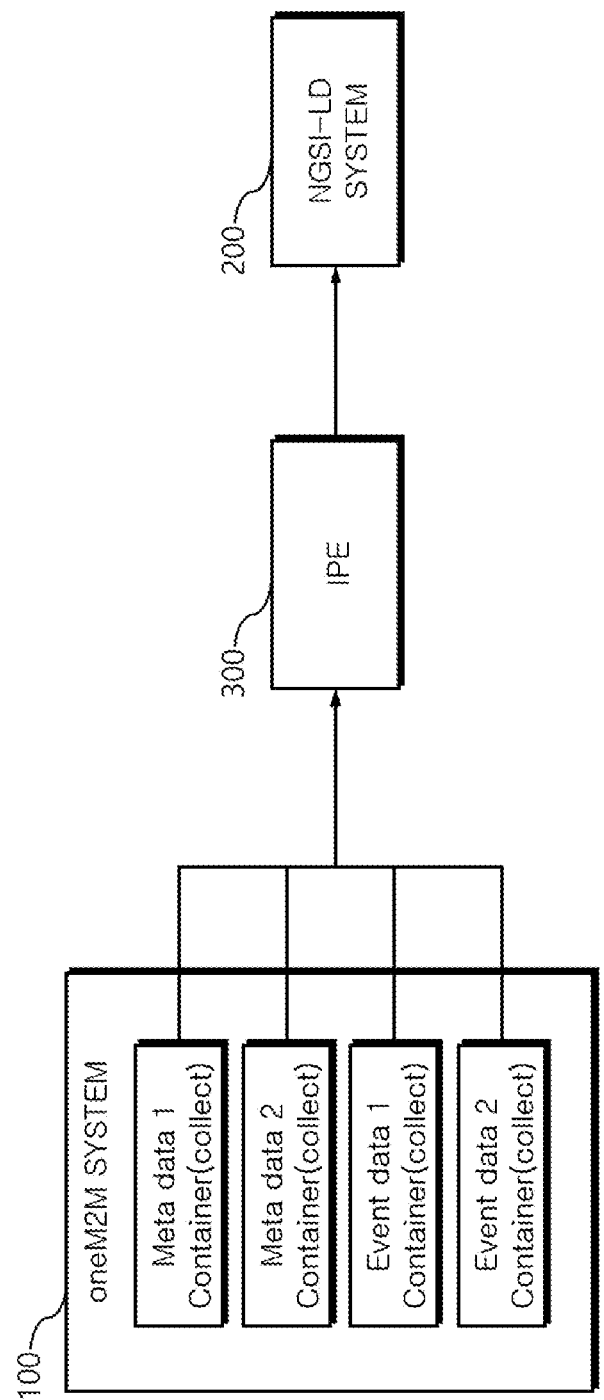
FIGS. 7 and 8 are views illustrating a concept of integrated data transmission.

At step 445, data transmission may be collectively performed. That is, as conceptually shown in FIG. 7, the IPE 300 may be implemented to collect a plurality of resource data, and to store the data in the corresponding entity of the NGSI-LD system 200. This method may be appropriate in the case of sensor data.

Figure 8:
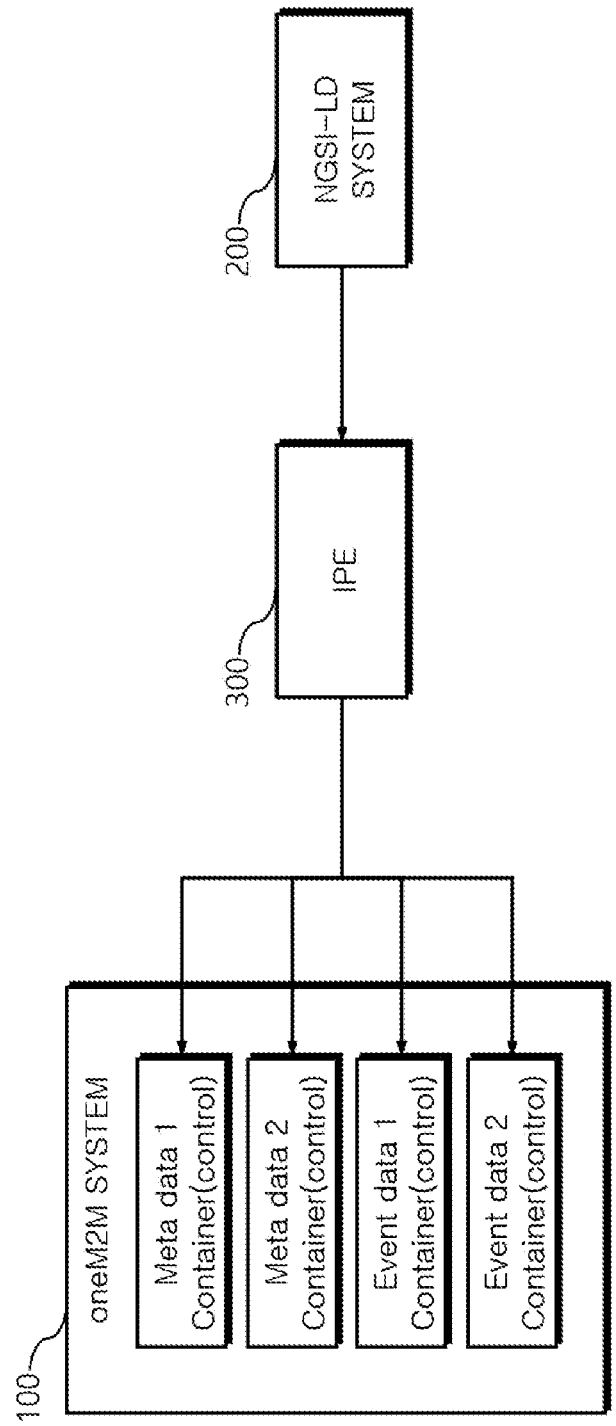

In this case, data transmission at step S460 may be collectively performed. That is, as conceptually shown in FIG. 8, the IPE 300 may be implemented to store entity data of the NGSI-LD system 200 in a plurality of resources. This method may be appropriate in the case of control data.

Figure 9:
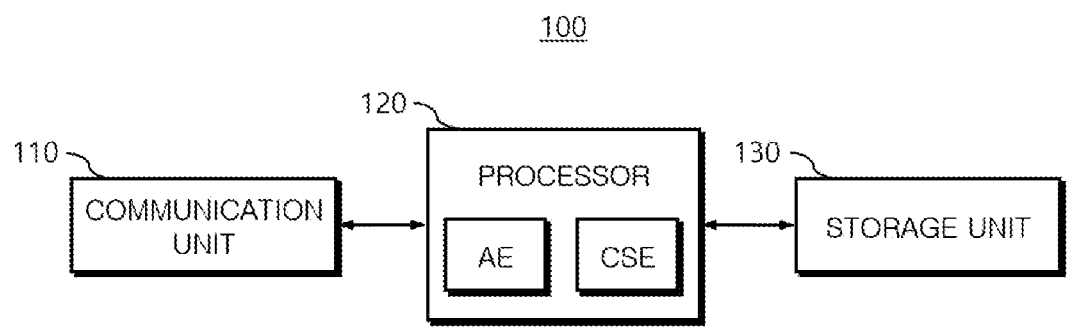
FIG. 9 is a block diagram of a oneM2M platform.

FIG. 9 is a block diagram of the oneM2M platform 100. As shown in the drawing, the oneM2M platform 100 may be implemented by a server system including a communication unit 110, a processor 120, and a storage unit 130.

The communication unit 110 is a communication means for communicating with IoT devices and the IPE 300. The processor 120 may include at least one application entity (AE) and a common service entity (CSE). The AE may not be included.

In an embodiment of the present disclosure, the processor 120 may perform the procedure that is performed by the oneM2M platform 100 among the processes illustrated in FIG. 3, and may provide a result of retrieving to the IPE 300 and may notify according to subscription. The storage unit 130 provides a storage space necessary for functions and operations of the processor 120.

Figure 10:
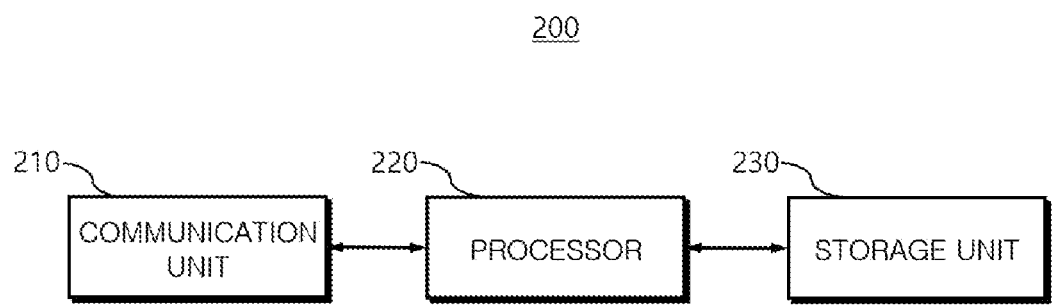
FIG. 10 is a block diagram of an NGSI-LD system.

FIG. 10 is a block diagram of the NGSI-LD system 200. As shown in the drawing, the NGSI-LD system 200 may be implemented by a server system including a communication unit 210, a processor 220, and a storage unit 230.

The communication unit 210 is a communication means for communicating with IoT devices and the oneM2M platform 100. The processor 220 performs the procedure that is performed by the NGSI-LD system 200 and the IPE 300 among the processes illustrated in FIG. 3, and performs a data interworking process. The storage unit 230 provides a storage space necessary for functions and operations of the processor 220.

Up to now, the interworking method between data stored in the resource (repository) of the oneM2M system and data stored in the entity (repository) of the NGSI-LD system has been described in detail with reference to preferred embodiments.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A data interworking method comprising:
    performing a first retrieval of retrieving, by an interworking proxy application entity (IPE), repositories in a first data platform system that perform data interworking with a second data platform system;
    performing a second retrieval of retrieving, by the IPE, labels of the retrieved repositories;
    acquiring, by the IPE, a mapping-rule from the retrieved labels;
    storing, by the IPE, the acquired mapping-rule; and
    performing a first interworking operation of interworking data of a repository of the second data platform system with data stored in a repository of the first data platform system, based on the stored mapping-rule,
    wherein the first data platform system is a oneM2M (one machine-to-machine) system, and the second data platform system is an NGSI-LD (Next Generation Service Interface-linked Data) system, and
    wherein the first interworking operation, performed by the NGSI-LD system, comprises:
    subscribing, by the NGSI-LD system, to a resource of the oneM2M system;
    receiving, by the NGSI-LD system, a notification regarding generation or refining of data of the resource; and
    storing, by the NGSI-LD system, the notified data in an entity of the NGSI-LD system.

2. The method of claim 1, further comprising understanding, by the IPE, a data interworking direction from the retrieved labels.

3. The method of claim 1, wherein the storing comprises collecting the notified data and then storing a result of the collecting in the entity.

4. The method of claim 1, further comprising performing a second interworking operation of interworking the data of the repository of the first data platform system with the data stored in the repository of the second data platform system, based on the stored mapping-rule.

5. The method of claim 4, wherein the first data platform system is a oneM2M system,
    wherein the second data platform system is an NGSI-LD system, and
    wherein the second interworking operation comprises:
    subscribing to an entity of the NGSI-LD system;
    receiving a notification regarding generation or refining of data of the entity; and
    storing the notified data in a resource of the oneM2M system.

6. The method of claim 5, wherein the storing comprises storing the notified data in a plurality of resources.

7. The method of claim 1, wherein the first data platform system is a oneM2M system,
wherein the repositories are resources, and
wherein the first retrieval operation comprises retrieving resources which interwork based on labels of the resources.

8. An IoT data platform system comprising:
a first data platform system comprising a first processor configured to collect and store data from IoT devices;
a second data platform system comprising a second processor configured to collect and store data from IoT devices; and
an interworking device comprising a third processor configured to retrieve repositories in the first data platform system that perform data interworking with the second data platform system, to retrieve labels of the retrieved repositories, to acquire a mapping-rule from the retrieved labels, to store the acquired mapping-rule, and to perform a first interworking operation of interworking data of a repository of the second data platform system with data stored in a repository of the first data platform system, based on the stored mapping-rule,
wherein the first data platform system is a oneM2M (one machine-to-machine) system, and the second data platform system is an NGSI-LD (Next Generation Service Interface-linked Data) system, and
wherein the first interworking operation comprises:
subscribing to a resource of the oneM2M system;
receiving a notification regarding generation or refining of data of the resource; and
storing the notified data in an entity of the NGSI-LD system.

9. A data interworking method comprising:
collecting and storing, by a second data platform system, from Internet of Things (IoT) devices;
performing a first retrieval operation of retrieving, by an interworking proxy application entity (IPE) established in the second data platform system, repositories in a first data platform system that perform data interworking with the second data platform system;
performing a second retrieval operation of retrieving, by the IPE, labels of the retrieved repositories;
acquiring, by the IPE, a mapping-rule from the retrieved labels;
storing, by the IPE, the acquired mapping-rule; and
performing a first interworking operation of interworking data of a repository of the second data platform system with data stored in a repository of the first data platform system, based on the stored mapping-rule,
wherein the first data platform system is a oneM2M (one machine-to-machine) system, and the second data platform system is an NGSI-LD (Next Generation Service Interface-linked Data) system, and
wherein the first interworking operation comprises:
subscribing to a resource of the oneM2M system;
receiving a notification regarding generation or refining of data of the resource; and
storing the notified data in an entity of the NGSI-LD system.

10. A data platform system comprising:
one or more processors configured to:
communicate with IoT devices and an external data platform system;
retrieve repositories in the external data platform system that perform data interworking with the data platform system, to retrieve labels of the retrieved repositories, and to acquire a mapping-rule from the retrieved labels;
store the acquired mapping-rule in a storage; and
perform a first interworking operation of interworking data of a repository of the second data platform system with data stored in a repository of the first data platform system, based on the stored mapping-rule,
wherein the first data platform system is a oneM2M (one machine-to-machine) system, and the second data platform system is an NGSI-LD (Next Generation Service Interface-linked Data) system, and
wherein the first interworking operation comprises:
subscribing to a resource of the oneM2M system;
receiving a notification regarding generation or refining of data of the resource; and
storing the notified data in an entity of the NGSI-LD system.

11. The system of claim 10, further comprising understanding, by the IPE, a data interworking direction from the retrieved labels.

12. The system of claim 10, wherein the storing comprises collecting the notified data and then storing a result of the collecting in the entity.

13. The system of claim 10, further comprising performing a second interworking operation of interworking the data of the repository of the first data platform system with the data stored in the repository of the second data platform system, based on the stored mapping-rule.

14. The system of claim 13, wherein the first data platform system is a oneM2M system,
wherein the second data platform system is an NGSI-LD system, and
wherein the second interworking operation comprises:
subscribing to an entity of the NGSI-LD system;
receiving a notification regarding generation or refining of data of the entity; and
storing the notified data in a resource of the oneM2M system.

15. The system of claim 14, wherein the storing comprises storing the notified data in a plurality of resources.

16. The system of claim 10, wherein the first data platform system is a oneM2M system,
wherein the repositories are resources, and
wherein the first retrieval operation comprises retrieving resources which interwork based on labels of the resources.

* * * * *